(12) United States Patent
Keller et al.

(10) Patent No.: US 6,787,615 B2
(45) Date of Patent: Sep. 7, 2004

(54) SYNTHESIS OF OLIGOMERIC POLY (SILARYLENE-SILOXANE-ACETYLENE)'S AND THEIR CONVERSION TO HIGH TEMPERATURE PLASTICS, ELASTOMERS, AND COATINGS

(75) Inventors: Teddy M. Keller, Fairfax Station, VA (US); Craig L. Homrighausen, Longmont, CO (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/054,970

(22) Filed: Jan. 25, 2002

(65) Prior Publication Data

US 2003/0158362 A1 Aug. 21, 2003

(51) Int. Cl.[7] .............................................. C08G 77/38
(52) U.S. Cl. ........................ 525/477; 528/43; 528/31; 528/32; 528/38; 528/35; 528/481; 525/478; 585/416; 556/410; 556/431
(58) Field of Search ................................. 525/477, 478; 528/43, 31, 32, 38, 35, 481; 585/416; 556/410, 431

(56) References Cited

U.S. PATENT DOCUMENTS

| | | | |
|---|---|---|---|
| 3,325,530 A | * | 6/1967 | Wu |
| 5,346,980 A | | 9/1994 | Babu |
| 5,563,181 A | | 10/1996 | Keller et al. |
| H1612 H | | 11/1996 | Rhein et al. |
| 5,578,380 A | | 11/1996 | Babu |
| 5,874,514 A | | 2/1999 | Keller et al. |

OTHER PUBLICATIONS

Homrighausen et al., Polymeric Materials Science and Engineering, vol. 83, (2000), 8–9.*

Macromolecules 1999 "Efficient Synthesis of Poly(sily ether)s by Pd/C and RhCl(PPh3)3–Catalyzed Cross–Dehydrocoupling Poymerization of Bis(hydrosilane)s with Diols"., 32, 6871–6873.

Macromolecules 2000 "Dehydrocoupling Polymerization of Bis–silanes and Disilanols to Poly(silyphenylenesiloxane) As Catalyzed by Rhodium Complexes"., 33, 3508 3510.

Journal of Polymer Science,"High–Temperature Elastomers from Silarylene–Siloxane–Diacetylene Linear Polymers" Part A Polymer Chemistry, vol. 40, 88–94(2002).

Non–provisional application–09/625,271,"High Temperature Elastomers from Linear Poly(Silarylene–Siloxane–Acety Lene)" Filed Jul. 25, 2000.

PCT application –PCT/US01/23304,"High Temperature Elastomers From Linear Poly(Silarylene–Siloxane–Acetylene)"Filed Jul. 25, 2000.

* cited by examiner

*Primary Examiner*—Kuo-Liang Peng
(74) *Attorney, Agent, or Firm*—John J. Karasek; Joseph T. Grunkemeyer (57) ABSTRACT

The invention comprises a networked polymer comprising the formula:

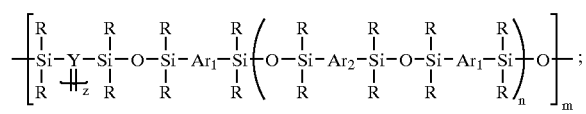

wherein $n \geq 1$; wherein n is an average value obtained by averaging all repeating units of the networked polymer; wherein $m \geq 1$; wherein Y is a divalent group containing one or more acetylenic groups, one or more crosslinks, or both;

wherein z is the average number of crosslinks per Y group; wherein $Ar_1$ and $Ar_2$ are independently selected aromatic groups; and wherein each R is independently selected from the group consisting of alkyl, aryl, alkylaryl, haloalkyl, haloaryl, and combinations thereof. The invention also includes prepolymers and precursors needed to make the networked polymer and processes for making all of the above. The invention also includes a ceramic composition made by pyrolysis of the networked polymer.

25 Claims, 3 Drawing Sheets

SYNTHESIS OF OLIGOMERIC POLY (SILARYLENE-SILOXANE-ACETYLENE)'S AND THEIR CONVERSION TO HIGH TEMPERATURE PLASTICS, ELASTOMERS, AND COATINGS

BACKGROUND OF THE INVENTION

1. Field of the Invention

This invention relates to silarylene-siloxane prepolymers, silarylene-siloxane-acetylene precursors, silarylene-siloxane-acetylene networked polymers, silicon-containing ceramic compositions, and processes for making the same.

2. Description of the Related Art

Functionalized organosilicon polymers represent a diverse class of materials that have found widespread use in a variety of applications, ranging from contact lenses, to medical implant devices to high-temperature materials for automotive and aircraft parts. Polysiloxanes or silicone polymers have been mostly studied and are of the greatest commercial importance. A major limitation of organosiloxane polymers is their limited long-term thermal stability at temperatures in excess of 200° C. caused primarily by ionic degradation reactions and formation of stable cyclic products such as six- and/or eight-membered siloxane rings. To improve long term thermal stability at high temperatures while retaining low temperature flexibility, various investigations have been directed toward the incorporation of aromatic units into the backbone or into the pendant groups to prevent formation of the cyclic products. However, some synthesis routes for these aromatic organosilicon polymers still result in degradative side reactions that limit molecular weight.

Silarylene-siloxane polymers, —[Si($R_2$)—Ar—{Si($R_2$)—O—}$_z$]—, in which a fraction of the total content of siloxy oxygens in the polysiloxane chain are replaced by aromatic units, are the most studied class of aromatic containing polymers. Four primary routes for the syntheses of silarylene-siloxane polymers in which one of the aforementioned difunctional monomers is allowed to react with an arylene-disilanol have been disclosed: chlorosilane (Lai et al., *J. Polym. Sci. Polym. Chem. Ed.,* 1982, 20, 2277), acetoxysilane (Rosenberg et al., *Polym. Preprints,* 1978, 19(2), 625), aminosilane (Burks et al., *J. Polym. Sci. Polym. Chem. Ed.,* 1973, 11, 319), and ureidosilane (Dvornic et al., W. *J. Polym. Sci. Polym. Chem. Ed.,* 1982, 20, 951) polycondensation methods. The occurrence of degradative side reactions between acidic by-products and the growing polymer chain has been shown to limit molecular weights and disrupt the truly alternating nature of the polymer structures prepared via the former two methods. The aminosilane method produces a weakly basic by-product. The ureidosilane route has been reported to be the method of choice for producing high-molecular weight linear silarylene-siloxane polymers with exactly alternating structures. The success of the ureidosilane method is due to the formation of an unreactive polycondensation by-product that reduces the occurrence of degradative side reactions.

Zhang et al. disclosed a process of making high-molecular-weight silphenylene-siloxane homopolymers and copolymers via dehydrocoupling polymerization using Wilkinson's catalyst (($Ph_3P_3$)RhCl). (*Macromolecules* 2000, 33, 3508). The compositions were made using a 1:1 molar ratio of the two monomers and did not have specific terminating groups. U.S. Pat. No. 5,874,514 to Keller et al. discloses linear inorganic-organic hybrid polymers having repeat units that contain at least one alkynyl group and at least one siloxanyl group within the backbone. U.S. Pat. No. 5,563,181 to Keller et al. discloses inorganic-organic hybrid thermoset polymers that are formed from linear inorganic-organic hybrid polymers having repeat units that contain at least one alkynyl group for cross-linking purposes and at least one siloxanyl group. U.S. Pat. Nos. 5,346,980 and 5,578,380 to Babu disclose crosslinkable copolymers suitable for use as elevated temperature pressure-sensitive adhesives comprising randomly arranged silarylene units and siloxane units. U.S. SIR H1612 to Rhein et al. discloses a method of making silarylene-siloxane polymers.

There is a need for oxidatively stable crosslinked silarylene-siloxane networked polymers. The networked polymers should be made by a process that avoids degradative side reactions that limit molecular weight and reduce performance at high temperatures. Such networked polymers are useful for high temperature plastics, elastomers, adhesives, and coatings. There is also a need for a hydroxy-terminated prepolymer needed to form the networked polymers. There is a further need for a ceramic composition formed from such networked polymers. Such materials would be useful in reinforced composites.

SUMMARY OF THE INVENTION

An object of the invention is to provide oxidatively stable silarylene-siloxane-acetylene networked polymers suitable for use as high temperature plastics, elastomers, adhesives, and coatings, capable of retaining their elastomeric properties up to 250° C.

A further object of the invention is to provide prepolymers and precursors that are needed to form the networked polymers of the invention.

A further object of the invention is to provide ceramic compositions, made by pyrolysis of the networked polymers, that are useful in reinforced composites.

A further object of the invention is to provide processes for making the networked polymers, prepolymers, and precursors of the invention, while avoiding degradative side reactions.

These and other objects of the invention are accomplished by a networked polymer comprising the formula:

wherein $n \geq 1$;

wherein n is an average value obtained by averaging all repeating units of the networked polymer;

wherein $m \geq 1$;

wherein Y is a divalent group containing one or more acetylenic groups, one or more crosslinks, or both;

wherein z is the average number of crosslinks per Y group;

wherein $Ar_1$ and $Ar_2$ are independently selected aromatic groups; and wherein each R is independently selected from the group consisting of alkyl, aryl, alkylaryl, haloalkyl, haloaryl, and combinations thereof.

A further embodiment of the invention is a precursor comprising the formula:

wherein n≧1;
wherein n is an average value obtained by averaging all repeating units of the precursor;
wherein m≧1;
wherein X is a divalent group containing one or more acetylenic groups;
wherein $Ar_1$ and $Ar_2$ are independently selected aromatic groups; and
wherein each R is independently selected from the group consisting of alkyl, aryl, alkylaryl, haloalkyl, haloaryl, and combinations thereof.

A further embodiment of the invention is a prepolymer comprising the formula wherein n≧1;
wherein T is either —H or —OH and both T's are the same;
wherein $Ar_1$ and $Ar_2$ are independently selected aromatic groups; and
wherein each R is independently selected from the group consisting of alkyl, aryl, alkylaryl, haloalkyl, haloaryl, and combinations thereof.

A further embodiment of the invention is a ceramic composition formed by pyrolysis of the above networked polymer.

A further embodiment of the invention is a process for making the prepolymer, being a hydroxy-terminated prepolymer or a hydride-terminated prepolymer, comprising the step of reacting one or more arylenedisilanols with one or more bissilarylenes.

A further embodiment of the invention is a process for making the precursor comprising the step of reacting a hydroxy-terminated prepolymer with a bis(dimethylaminosilyl)alkyne.

A further embodiment of the invention is a process for making the networked polymer comprising the step of crosslinking the precursor.

LIST OF REFERENCE NUMBERS 100 arylenedisilanol
102 bissilarylene
104 hydroxy-terminated prepolymer
106 bis(dimethylaminosilyl)alkyne
108 precursor
110 networked polymer
112 ceramic composition
200 1,4-bis(hydroxydimethylsilyl)benzene
202 1,4-bis(dimethylsilyl)benzene
204 hydroxy-terminated prepolymer
206 1,4-bis(dimethylaminodimethylsilyl)butadiyne
208 precursor
210 networked polymer
212 ceramic composition
300 arylenedisilanol
302 bissilarylene
303 hydride-terminated prepolymer
304 hydroxy-terminated prepolymer
305 arylenedisilanol

DETAILED DESCRIPTION OF THE PREFERRED EMBODIMENTS

Figure 1:
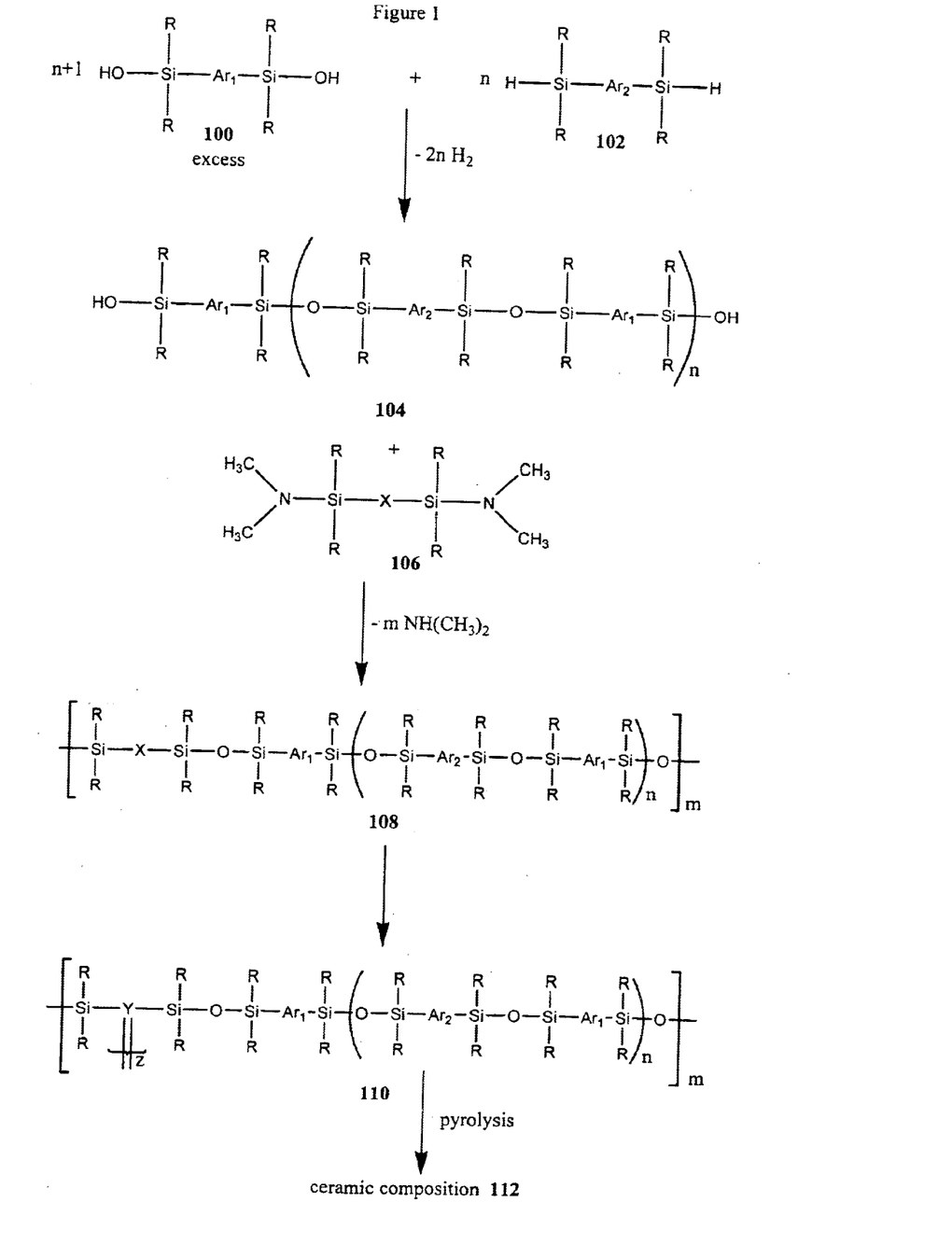
FIG. 1 shows a general process for making the hydroxy-terminated prepolymer, the precursor, the networked polymer, and the ceramic composition.

The synthesis of the networked polymer 110 of the invention is performed in three reaction steps. Each step is a novel process and produces a novel composition. One additional step can be performed to produce the ceramic composition 112. FIG. 1 shows the general scheme for the reaction. First, one or more arylenedisilanols 100 and one or more bissilarylenes 102 are reacted to form a hydroxy-terminated prepolymer 104. The hydroxy-terminated prepolymer 104 is than reacted with a bis(dimethylaminosilyl)alkyne 106 to form a precursor 108. The precursor 108 is then crosslinked to form a networked polymer 110.

1. Formation of the Prepolymer

In the first step one or more arylenedisilanols (HORRSi—$Ar_1$—SiRROH) 100 are reacted with one or more bissilarylenes (HRRSi—$Ar_2$—SiRRH) 102 to make a prepolymer. Preferably, only one arylenedisilanol 100 compound and only one bissilarylene 102 compound are used. As shown in FIG. 1, the bissilarylene 102 must have one or more hydride groups on each silicon atom, and the term bissilarylene in this application refers only to such compounds. The $Ar_1$ and $Ar_2$ are independently selected aromatic groups. The aromatic group can be any group containing one or more linear or fused aromatic rings, with or without intervening functional groups, wherein both silicon atoms are bonded directly to the same or different aromatic rings. Phenylene is a preferred aromatic group. 1,4-Phenylene is a more preferred aromatic group. The general structures are shown using only $Ar_1$ and $Ar_2$ to illustrate the alternating addition of arylenedisilanol 100 and bissilarylene 102. When multiple arylenedisilanols 100 and bissilarylenes 102 are used, $Ar_1$ and $Ar_2$ may each represent more than one different aromatic group. Each R represents a functional group selected from the group consisting of alkyl, aryl, alkylaryl, haloalkyl, haloaryl, and combinations thereof. Methyl is a preferred R group. More preferably, every R group is methyl. Each aromatic group and R group can be selected independently from the others when used in any process step or composition of the invention. The aromatic groups and R groups do not directly participate in the reactions of the invention. Thus the process should not be significantly affected regardless of the specific aromatic groups and R groups chosen.

The particular value for n and the particular choices for the R groups and aromatic groups may be selected according to the particular properties desired for the precursor 108, networked polymer 110, and ceramic composition 112. Increasing the relative number of silarylene and siloxane units (by increasing n) increases the chain flexibility. Using longer chain R groups increases the solubility of the precursor 108 in organic solvents. Longer chain R groups also increase the hydrophobicity and decrease the thermo-oxidative stability of the networked polymer 110. Aryl-containing R groups increase the stiffness and slightly increase the thermo-oxidative stability. Larger aromatic groups (Ar) add stiffness.

The integer n must be greater than or equal to 0. A novel compound is formed when n is greater than or equal to 1. When n=0, the reaction is unnecessary and an unreacted arylenedisilanol 100 is used as the hydroxy-terminated prepolymer 104. An unreacted bissilarylene 102 is not suitable for the next reaction step. It should be noted that the repeating unit of the prepolymer contains both an arylene-disilanol 100 unit and a bissilarylene 102. Therefore the prepolymer contains 2n+1 arylenedisilanol 100 and bissilarylene 102 units.

The reaction of excess arylenedisilanol 100 with bissilarylene 102 produces an oligomeric hydroxy-terminated prepolymer 104. The oligomeric chain is formed by the dehydrogenative coupling of the two reactants. When arylenedisilanol 100 reacts with bissilarylene 102, $H_2$ is lost, creating a siloxane linkage between the two reactants. The chain grows longer by alternating addition of arylenedisilanol 100 and bissilarylene 102 and loss of $H_2$ with each addition.

The length of the hydroxy-terminated prepolymer 104 chain can be controlled by adjusting the molar ratio of the reactants. The arylenedisilanol 100 must be present in an excess amount to ensure hydroxy termination on both ends of the chain. For example, a 3:2 molar ratio of arylenedisilanol 100 and bissilarylene 102 produces an average chain length of 5 units and an average n of 2. The average hydroxy-terminated prepolymer 104 contains 3 units of arylenedisilanol 100 and 2 units of bissilarylene 102 in an alternating structure, with hydroxy termination on both ends of the chain. The terminal hydroxy groups cannot react with the arylenedisilanol 100. Once all the bissilarylene 102 has been consumed and terminated with arylenedisilanol 100, reaction will cease.

Figure 3:
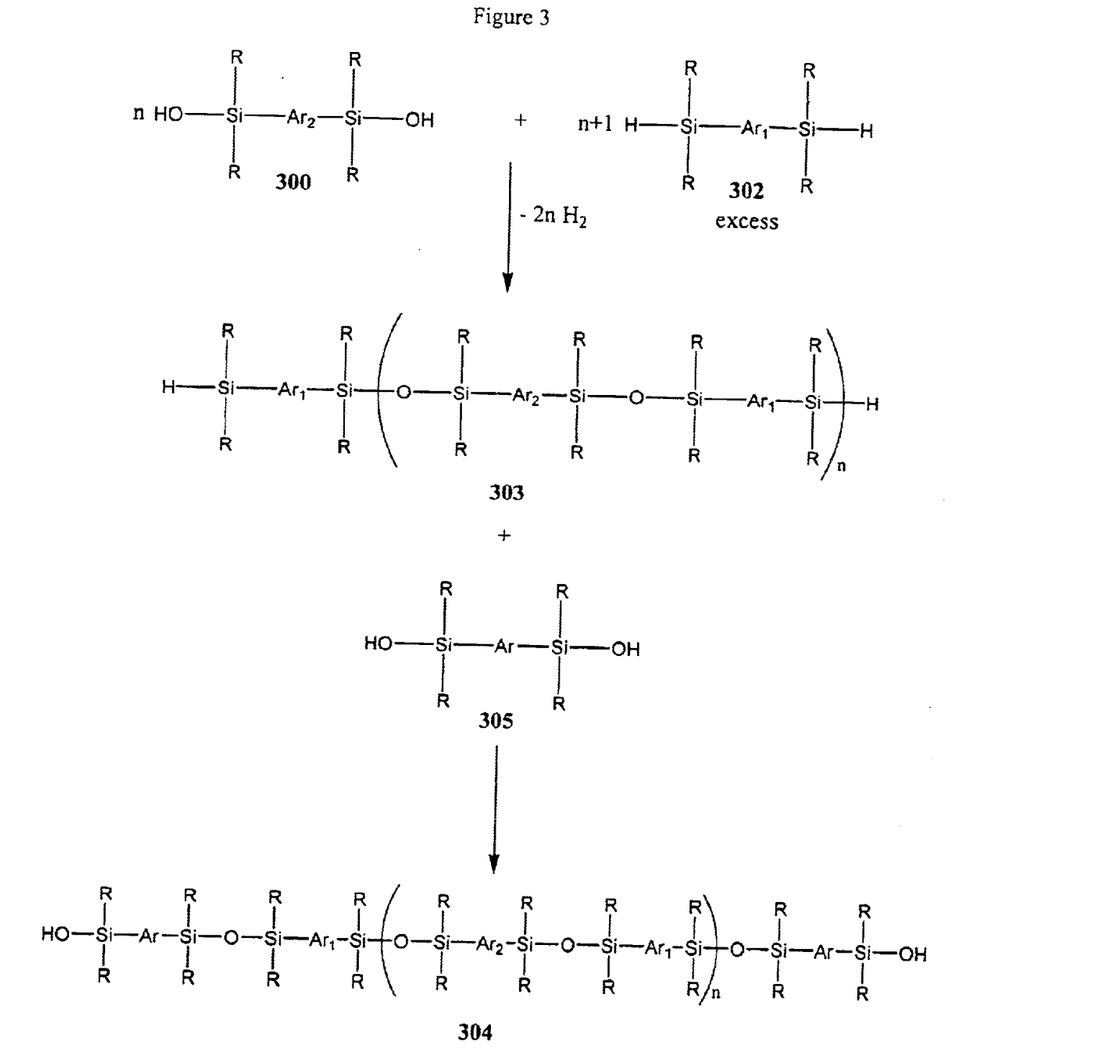
FIG. 3 shows a multi-step process for making a hydroxy-terminated prepolymer via a hydride-terminated prepolymer.

A novel composition is also produced when the bissilarylene 302 is present in an excess amount. This scheme is illustrated in FIG. 3. Excess bissilarylene 302 results in a hydride-terminated prepolymer 303. The length of the hydride-terminated prepolymer 303 is controlled in the same way as that of the hydroxy-terminated prepolymer 104. The hydride-terminated prepolymer 303 is within the scope of the invention. However, it must be converted to a hydroxy-terminated prepolymer 304 in order to make the precursor 108. This conversion can be done by any means known in the art that results in a hydroxy-terminated prepolymer 104 with the structure shown in FIG. 1. This can be done by a reaction that converts the terminal hydrides to hydroxies without affecting any other atoms of the hydride-terminated prepolymer 303. It can also be done by increasing the chain length of the prepolymer. FIG. 3 illustrates such a scheme. The hydride-terminated prepolymer 303 is reacted with additional arylenedisilanol 305, which can be different from the first arylenedisilanol 300. The resulting hydroxy-terminated prepolymer 304 can then be used in the next reaction step.

The arylenedisilanol 100 and bissilarylene 102 may have an asymmetrical arrangement of R functional groups. However, the reaction may first occur at either of the hydroxy or hydride groups in a particular molecule. Therefore some repeating units may have a mirror-image arrangement of R groups relative to the other repeating units. Each possible arrangement is an enantiomer of the same prepolymer. This is illustrated in the structure below of a specific hydroxy-terminated prepolymer 104 with n=1.

This hydroxy-terminated prepolymer 104 contains two units of a arylenedisilanol 100 that contains one chloromethyl group. In the left-most unit the chloromethyl group is to the right of the $Ar_1$ group and in the right-most unit the chloromethyl group is to the left of the $Ar_1$ group. Two more enantiomers would have the chloromethyl groups on the same side of the $Ar_1$ groups, either to the left or the right. The longer the prepolymer chain, the more enantiomers are possible. The general structures of the compositions of the invention include all possible enantiomers of the prepolymer, the precursor 108, and the networked polymer 110.

The advantage of using dehydrogenative coupling is that the formation of molecular hydrogen as a by-product eliminates degradative side reactions that limit molecular weight and disrupt the alternating structure. The completion of the reaction when making a hydroxy-terminated prepolymer 104 can be confirmed by IR analysis of the Si—H stretching band in the bissilarylene 102. When this band disappears, the reaction is complete.

Preferably, a catalyst is used in the reaction. Preferably, the reaction is catalyzed with a rhodium-containing compound. Wilkinson's catalyst, $(Ph_3P_3)RhCl$, is a preferred rhodium-containing compound. Other possible catalysts include tris(dibenzylideneacetone)dipalladium-chloroform adduct $(Pd_2(dba)_3$—$CHCl_3)$, palladium on activated carbon, dicobalt octacarbonyl $(Co_2CO_8)$, and bis(cyclooctadiene) nickel $Ni(cod)_2$.

Figure 2:
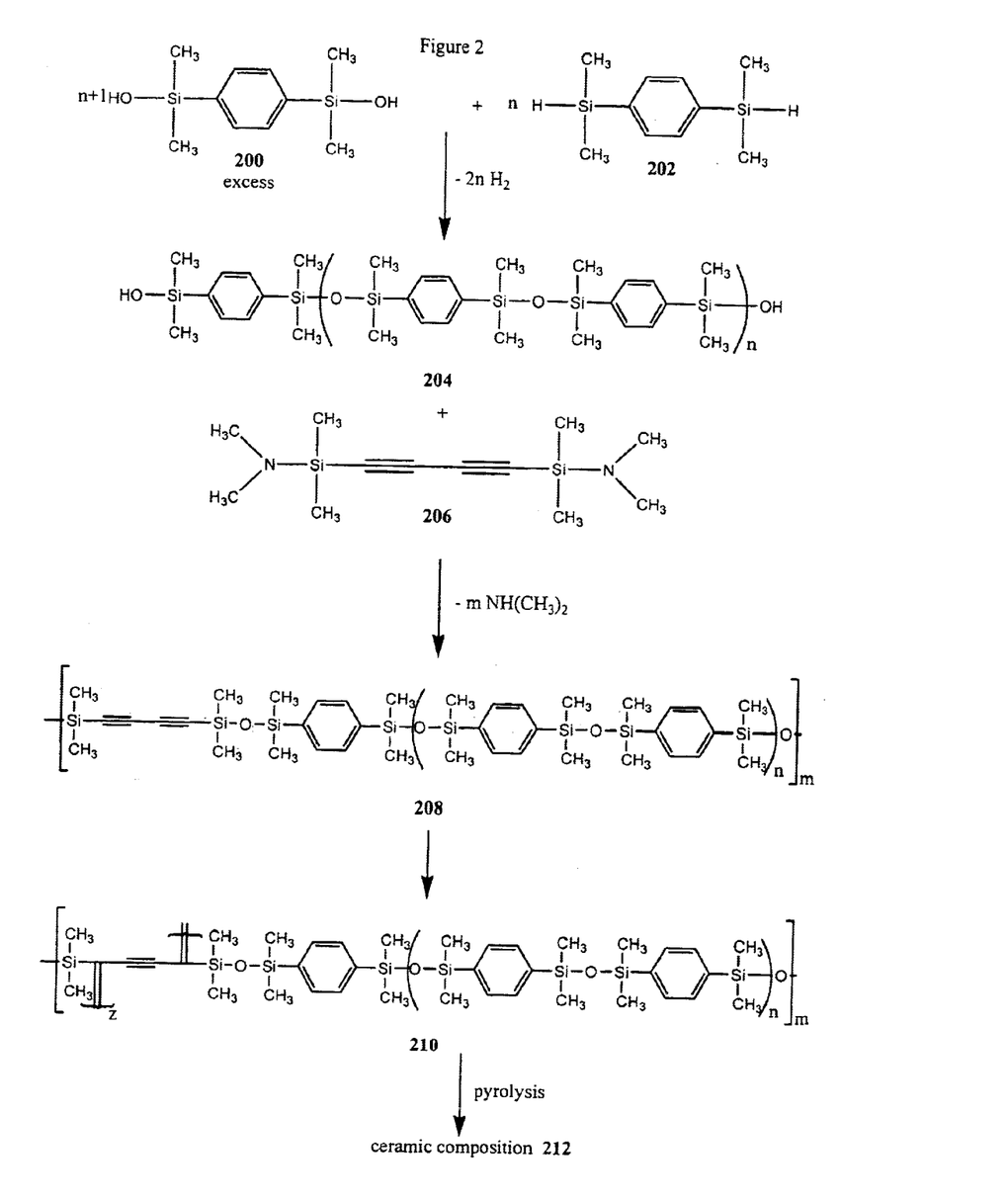
FIG. 2 shows a process for making a hydroxy-terminated prepolymer, precursor, networked polymer, and ceramic composition using specific reactants.

FIG. 2 shows preferred reactants for the process. 1,4-bis(hydroxydimethylsilyl)benzene $(HO(CH_3)_2Si$—$C_6H_4$—$Si(CH_3)_2OH)$ 200 is reacted with 1,4-bis(dimethylsilyl)benzene $(H(CH_3)_2Si$—$C_6H_4$—$Si(CH_3)_2H)$ 202 to produce the hydroxy-terminated prepolymer 204. $^1H$ NMR and $^{13}C$ NMR can be used to verify that the hydroxy-terminated prepolymer has a truly alternating structure. In that case, there is a single signal for the methyl protons and methyl carbons.

2. Formation of the Precursor

In the next reaction step, the hydroxy-terminated prepolymer 104 is reacted with a bis(dimethylaminosilyl)alkyne $[(CH_3)_2N$—$RRSi$—$X$—$SiRR$—$N(CH_3)_2]$ 106. The X in the bis(dimethylaminosilyl)alkyne 106 is a divalent group containing one or more acetylenic groups. When there is more than one acetylenic group, the acetylenic groups may or may not be conjugated. The reaction produces the precursor 108. The structure of the precursor 108 alternates between units of the prepolymer 104 and units of the bis(dimethylaminosilyl)alkyne 106. The precursor 108 can be a monomer when m=1, or can be oligomeric or polymeric when m≧2. Because the synthesis of the hydroxy-terminated prepolymer 104 produces chains of varying lengths, n in the precursor 108 is an average value greater than or equal to 0, obtained by averaging all repeating units of the precursor 108.

The reaction can proceed without a catalyst and results in the loss of dimethylamine. Preferably, the bis(dimethylaminosilyl)alkyne 106 is added to the reaction mixture in more than one aliquot. $^1$H NMR can be used to determine whether excess bis(dimethylaminosilyl)alkyne 106 remains, requiring the addition of additional hydroxy-terminated prepolymer 104 to consume the bis(dimethylaminosilyl)alkyne 106.

FIG. 2 shows preferred reactants for the process. 1,4-bis(dimethylaminodimethylsilyl)butadiyne [(CH$_3$)$_2$N—Si(CH$_3$)$_2$—C≡C—C≡C—Si(CH$_3$)$_2$—N(CH$_3$)$_2$] 206 is reacted with the hydroxy-terminated prepolymer 204 described above to produce the precursor 208.

3. Formation of the Networked Polymer

The final reaction step is the crosslinking of the precursor 108 to produce a networked polymer 110. Y in the networked polymer 110 is a divalent group containing one or more acetylenic groups, one or more ethenyl crosslinks, or both. Within each Y, a former acetylenic group may be converted to a single bond between ethenyl crosslinks, or a former pair of conjugated acetylenic groups may be converted to a single acetylenic group between ethenyl crosslinks. Other crosslinking schemes are also possible and are known in the art. Crosslinking does not necessarily occur in every repeating unit; thus z represents average number of crosslinks per Y group. The value n is an average value greater than or equal to 0, obtained by averaging all repeating units of the networked polymer 110.

The crosslinking can be performed by heating the precursor 108. The heating conditions can be at least sufficient to initiate crosslinking, but not severe enough to cause degradation of the precursor 108 or the networked polymer 110. Preferably, the heating is done from about 100° C. to about 500° C. The use of a nitrogen atmosphere allows the heating to be done at the high end of the temperature range. Such high temperatures may cause degradation if it were done under an oxidizing atmosphere.

The number of crosslinks per unit volume can be controlled by controlling length of the hydroxy-terminated prepolymer 104, which is controlled by the molar ratio of arylenedisilanol 100 to bissilarylene 102 as described above. A shorter hydroxy-terminated prepolymer 104 results in closer spacing of the crosslinkable acetylenic groups in the precursor 108. As the hydroxy-terminated prepolymer 104 gets longer, the spacing of the crosslinkable acetylenic groups increases. The greater the spacing, the lower the number of crosslinks per unit volume. Physical properties typically depend on the degree of crosslinking. Thus, the physical properties can be controlled by controlling the molar ratio of reactants in the first step of the process.

FIG. 2 shows the crosslinking of a preferred precursor 208 described above. The networked polymer 210 illustrates the conversion of a pair of conjugated acetylenic groups to a single acetylenic group between ethenyl crosslinks.

The process described above can produce networked polymers 110 that are completely insoluble in typical organic solvents. By varying the crosslink density of the networked polymer 110, polymeric materials can be obtained that vary from slightly (elastomeric) to highly (plastic) crosslinked systems. The networked polymers 110 can be oxidatively stable and can retain their elastomeric properties up to about 250° C. When aged at higher temperatures for extended times, they can lose weight and become brittle.

4. Formation of the Ceramic Composition

The final composition of the invention is a ceramic composition 112 that can be produced by pyrolysis of the networked polymer 110. The networked polymer 110 should be heated to a temperature at which the thermal degradation commences. Heating can be continued until the weight loss of the material has ceased. The temperature can be increased during the degradation to enable or hasten the completion of degradation to the ceramic composition 112. Preferably the heating is done from about 400° C. to about 600° C., and more preferably to about 500° C. FIGS. 1 and 2 illustrate the thermal degradation step for the general scheme (FIG. 1) and for specific networked polymers 210 (FIG. 2). A fiber-reinforced composite can be made by mixing the precursor 108 with the fibers, then performing the crosslinking to a networked polymer 110, and pyrolysis to a ceramic composition 112.

Having described the invention, the following examples are given to illustrate specific applications of the invention including specific techniques that can be used to perform the invention. These specific examples are not intended to limit the scope of the invention described in this application. The examples are directed to hydroxy-terminated prepolymers, precursors, and networked polymers where n is 1, 2, 3, or 4.

EXAMPLE 1

Synthesis of 1,4-bis(dimethylaminodimethylsilyl)butadiyne—A flame dried 250 mL Schlenk flask containing diethyl ether (20 mL) was cooled to −78° C. and n-butyl lithium (20 mL of 2.4 M in hexane, 48.0 mmol) was added by syringe. After several minutes, hexachlorobutadiene (1.88 mL, 12.0 mmol) was added drop wise via syringe over a 10 minute period. After completion of addition, the cold bath was removed and the mixture stirred at room temperature for 3 hours. The resulting 1,4-dilithio-1,3-butadiyne was used without further purification. The flask was then recooled to −78° C. and dimethylaminodimethylchlorosilane (3.6 mL, 24 mmol) was added by syringe. The flask was removed from the cold bath and the reaction mixture stirred at room temperature for 16 hours. At this time, $^1$H NMR analysis indicated complete disappearance of dimethylaminodimethylchlorosilane and formation of 1,4-bis(dimethylaminodimethylsilyl)butadiyne 206. Diethyl ether was removed in vacuo, and the mixture taken up in a minimum amount of pentane and filtered. Pentane was removed in vacuo to give 2.91 g (96%) of 1,4-bis(dimethylaminodimethylsilyl)butadiyne 206 as a viscous red liquid. IR (cm$^{-1}$) 2074 (s), (—C≡C—C≡C—). $^1$H NMR (ppm) 2.44 (s), (N(CH$_3$)$_2$), 0.20 (s), (Si(CH$_3$)$_2$). $^{13}$C NMR 87.6, 84.4, (—C≡C—C≡C—) 37.7, (N(CH$_3$)$_2$), −1.2, (Si(CH$_3$)$_2$).

EXAMPLE 2

Synthesis of the Hydroxy-Terminated Prepolymer, Where n=1—To a flame dried 2-necked flask equipped with a reflux condenser was added 1,4-bis(hydroxydimethylsilyl)benzene 200 (1.87 g, 8.25 mmol), 10 mL of THF was injected via syringe followed by 1,4-bis(dimethylsilyl)benzene 202 (0.80 g, 4.12 mmol). The (Ph$_3$P$_3$)RhCl catalyst (0.032 g, 0.032 mmol) was added and the reaction mixture heated to reflux temperature and maintained for 48 hours. IR analysis of the reaction mixture indicated complete disappearance of Si—H stretching band of 1,4-bis(dimethylsilyl)benzene, therefore the reaction was deemed complete. The THF was removed in vacuo to give 2.17 g (82%) of prepolymer 204 as a pale yellow solid. IR (cm$^{-1}$) 3276 (m, Si—OH), 1072 (s, Si—O). $^1$H NMR (ppm) 7.58 (s), 7.52 (s) (C$_6$H$_4$), 0.37 (s), 0.31 (s) (Si—CH$_3$). $^{13}$C NMR (ppm) 140.8, 140.6, 132.4 132.2 (C$_6$H$_4$), 0.88, −0.05 (Si—CH$_3$).

EXAMPLE 3

Synthesis of the Hydroxy-Terminated Prepolymer, Where n=2—To a flame dried 2-necked flask equipped with a reflux condenser was added 1,4-bis(hydroxydimethylsilyl)benzene 200 (2.09 g, 9.25 mmol), 10 mL of THF was injected via syringe followed by 1,4-bis(dimethylsilyl)benzene 202 (1.19 g, 6.16 mmol). The (Ph$_3$P$_3$)RhCl catalyst (0.017 g, 0.018 mmol) was added and the reaction mixture heated to 55–60° C. and maintained for 3.5 hours. IR analysis of the reaction mixture indicated complete disappearance of Si—H stretching band of 1,4-bis(dimethylsilyl)benzene, therefore the reaction was deemed complete. The THF was removed in vacuo to give 2.79 g (86%) of prepolymer 204 as a pale yellow solid. IR (cm$^{-1}$) 3341 (vw, Si—OH), 1078 (s, Si—O). $^1$H NMR (ppm) 7.54 (s), (C$_6$H$_4$), 0.33 (s), (Si—CH$_3$). $^{13}$C NMR (ppm) 140.8, 132.2 (C$_6$H$_4$), 0.91 (Si—CH$_3$).

EXAMPLE 4

Synthesis of the Hydroxy-Terminated Prepolymer, Where n=3—To a flame dried 2-necked flask equipped with a reflux condenser was added 1,4-bis(hydroxydimethylsilyl)benzene 200 (0.76 g, 3.36 mmol), 8 mL of THF was injected via syringe followed by 1,4-bis(dimethylsilyl)benzene 202 (0.49 g, 2.52 mmol). The (Ph$_3$P$_3$)RhCl catalyst (0.006 g, 0.007 mmol) was added and the reaction mixture heated to 40° C. and maintained for 1.5 hours. IR analysis of the reaction mixture indicated complete disappearance of Si—H stretching band of 1,4-bis(dimethylsilyl)benzene, therefore the reaction was deemed complete. The THF was removed in vacuo to give 1.12 g (90%) of prepolymer 204 as a gray solid. IR (cm$^{-1}$) 3289 (m, Si—OH), 1065 (s, Si—O). $^1$H NMR (ppm) 7.55 (s) (C$_6$H$_4$), 0.33 (s) (Si—CH$_3$). $^{13}$C NMR (ppm) 140.8, 132.3 (C$_6$H$_4$), 0.92 (Si—CH$_3$).

EXAMPLE 5

Synthesis of the Hydroxy-Terminated Prepolymer, Where n=4—To a flame dried 2-necked flask equipped with a reflux condenser was added 1,4-bis(hydroxydimethylsilyl)benzene 200 (1.34 g, 5.9 mmol), 10 mL of THF was injected via syringe followed by 1,4-bis(dimethylsilyl)benzene 202 (0.92 g, 4.75 mmol). The (Ph$_3$P$_3$)RhCl catalyst (0.011 g, 0.011 mmol) was added and the reaction mixture heated to 55° C. and maintained for 3.5 hours. IR analysis of the reaction mixture indicated incomplete disappearance of Si—H stretching band of 1,4-bis(dimethylsilyl)benzene, therefore the reaction temperature was reduced to 40° C. and maintained for 14 hours. At this time IR analysis indicated reaction completion. The THF was removed in vacuo to give 1.97 g (88%) of prepolymer 204 as a pale yellow solid. IR (cm$^{-1}$) 3379 (m, Si—OH), 1072 (s, Si—O). $^1$H NMR (ppm) 7.62 (s) (C$_6$H$_4$), 0.41 (s) (Si—CH$_3$). $^{13}$C NMR (ppm) 140.8, 132.6 (C$_6$H$_4$), 0.92 (Si—CH$_3$).

EXAMPLE 6

Synthesis of the Precursor, Where n=1—To a flame dried three-necked flask equipped with a stir bar, reflux condenser, and inlet (syringe needle) and outlet adapters for argon gas was added the previously prepared hydroxy-terminated prepolymer 204 (0.47 g, 0.73 mmol) (see Example 2). A previously prepared sample of 1,4-bis(dimethylaminodimethylsilyl)butadiyne 206 (0.18 g, 0.73 mmol) was dissolved in 10 mL of toluene. A 9.5 mL aliquot of the toluene solution was added to the three-necked flask containing the prepolymer 204. After refluxing the reaction mixture for about 1 hour an additional amount of the toluene solution containing 1,4-bis(dimethylaminodimethylsilyl) butadiyne 206 (250 µL) was added at time intervals of 15 minutes until the viscosity of the solution had visibly increased and dimethylamine evolution had ceased, as determined by placing a piece of moist litmus paper into the exhaust stream of the argon outlet. After 5 hours an aliquot was removed and a $^1$H NMR spectrum was acquired. After an additional 1 hour at reflux the temperature was reduced to ambient and the solution stirred under a continuous flow of argon overnight. The resulting yellow-brown residue was dissolved in diethyl ether and poured into a separatory funnel containing 20 mL of ice cold NH$_4$Cl (aq). To break up an emulsion, 10 mL of saturated NaCl (aq) was added. The aqueous layer was then extracted twice with 25 mL of diethyl ether. The combined ether extract was dried over anhydrous Na$_2$SO$_4$ and filtered. The solvent was removed in vacuo to give 0.56 g, (95%) of the precursor 208, where n=2 as a brown solid. IR (cm$^{-1}$) 2080 (w, —C≡C—C≡C—), 1072 (s, Si—O). $^1$H NMR (ppm) 7.52 (s) (C$_6$H$_4$), 0.35 (s) 0.31 (s) 0.24 (s) (Si—CH$_3$). $^{13}$C NMR (ppm) 141.0, 132.2, (C$_6$H$_4$), 86.9, 84.9 (—C≡C—C≡C—), 2.07, 1.80, 0.91, 0.59 (Si—CH$_3$).

EXAMPLE 7

Synthesis of the Precursor, Where n=2—To a flame dried three-necked flask equipped with a stir bar, reflux condenser, and inlet (syringe needle) and outlet adapters for argon gas was added the previously prepared hydroxy-terminated prepolymer 204 (2.75 g, 2.61 mmol) (see Example 3). A previously prepared sample of 1,4 bis(dimethylaminodimethylsilyl)butadiyne 206 (0.66 g, 2.61 mmol) was dissolved in 10 mL of toluene. A 9.5 mL aliquot of the toluene solution was added to the three-necked flask containing the prepolymer 204. After refluxing the reaction mixture for 1 hour an additional amount of the toluene solution containing 1,4-bis(dimethylaminodimethylsilyl) butadiyne 206 (250 µL) was added at time intervals of 15 minutes until the viscosity of the solution had visibly increased and dimethylamine evolution had ceased, as determined by placing a piece of moist litmus paper into the exhaust stream of the argon outlet. After 5.5 hours an aliquot was removed and a $^1$H NMR spectrum was acquired. An excess amount of 1,4-bis(dimethylaminodimethylsilyl) butadiyne 206 was detected so an additional small amount of prepolymer 204 was added to the solution. The temperature was reduced to 60° C. and the solution stirred under a continuous flow of argon overnight. The resulting yellow-brown residue was dissolved in diethyl ether and poured into a separatory funnel containing 50 mL of ice cold NH$_4$Cl (aq). To break up an emulsion, 10 mL of saturated NaCl (aq) was added. The aqueous layer was then extracted twice with 15 mL of diethyl ether. The combined ether extract was dried over anhydrous Na$_2$SO$_4$ and filtered. The solvent was removed in vacuo to give 2.84 g, (90%) of precursor 208, where n=4 as a brown solid. IR (cm$^{-1}$) 2074 (w, —C≡C—C≡C—), 1078 (s, Si—O). $^1$H NMR (ppm) 7.54 (s) (C$_6$H$_4$), 0.33 (s) (Si—CH$_3$). $^{13}$C NMR (ppm) 140.7, 132.3, (C$_6$H$_4$), 86.9, 84.9 (—C≡C—C≡C—), 1.78, 0.90, (Si—CH$_3$).

EXAMPLE 8

Synthesis of the Precursor, Where n=3—To a flame dried three-necked flask equipped with a stir bar, reflux condenser, and inlet (syringe needle) and outlet adapters for argon gas was added the previously prepared hydroxy-terminated prepolymer 204 (0.59 g, 0.40 mmol) (see Example 4). 8 mL of toluene was added and the solution was stirred until complete dissolution of the prepolymer 204 was achieved. A previously prepared sample of 1,4-bis (dimethylaminodimethylsilyl)butadiyne 206 (0.10 g, 0.40 mmol) was dissolved in 4 mL of toluene and a 3.9 mL aliquot of this solution was added to the three-necked flask containing the prepolymer 204. After refluxing the reaction mixture for 1 to 2 hours an additional amount of the toluene solution containing 1,4-bis(dimethylaminodimethyl-silyl) butadiyne 206 (20–30 $\mu$L) was added at time intervals of 15 minutes until the viscosity of the solution had visibly increased and dimethylamine evolution had ceased, as determined by placing a piece of moist litmus paper into the exhaust stream of the argon outlet. The solution was refluxed for a total of five hours. The temperature was reduced to 45° C. and the solution stirred under a continuous flow of argon overnight. The resulting yellow-brown residue was dissolved in diethyl ether and poured into a separatory funnel containing 20 mL of ice cold $NH_4Cl$ (aq). To break up an emulsion, 5 mL of saturated NaCl (aq) was added. The aqueous layer was then extracted twice with 15 mL of diethyl ether. The combined ether extract was dried over anhydrous $Na_2SO_4$ and filtered. The solvent was removed in vacuo to give 0.64 g, (95%) of precursor 208, where n=6 as a brown solid. IR ($cm^{-1}$) 2080 (w, —C≡C—C≡C—), 1072 (s, Si—O). $^1$H NMR (ppm) 7.60 (s) ($C_6H_4$), 0.39 (s) (Si—$CH_3$). $^{13}$C NMR (ppm) 140.8, 132.2, ($C_6H_4$), 86.9, 84.9 (—C≡C—C≡C—), 0.92 (Si—$CH_3$).

EXAMPLE 9

Synthesis of the Precursor, Where n=4—To a flame dried three-necked flask equipped with a stir bar, reflux condenser, and inlet (syringe needle) and outlet adapters for argon gas was added the previously prepared hydroxy-terminated prepolymer 204 (0.65 g, 0.34 mmol) (see Example 5). A previously prepared sample of 1,4-bis (dimethylaminodimethylsilyl)butadiyne 206 (0.08 g, 2.61 mmol) was dissolved in 7 mL of toluene. A 6.8 mL aliquot of the toluene solution was added to the three-necked flask containing the prepolymer 204. After refluxing the reaction mixture for 1 hour an additional amount of the toluene solution containing 1,4-bis(dimethylaminodimethylsilyl) butadiyne 206 (20–40 $\mu$L) was added at time intervals of 15 minutes until the viscosity of the solution had visibly increased and dimethylamine evolution had ceased, as determined by placing a piece of moist litmus into the exhaust stream of the argon outlet. The solution was refluxed for a total of 4.5 hours. The temperature was reduced to 50° C. and the solution stirred under a continuous flow of argon overnight. At this time all of the solvent had been removed. Dissolution of the resulting brown solid in toluene followed by a litmus paper test indicated that the solution was neutral. Yield (based upon total amount collected) 0.65 g, (92%) of precursor 208, where n=8 as a brown solid. IR ($cm^{-1}$) 2080 (w, —C≡C—C≡C—), 1059 (s, Si—O). $^1$H NMR (ppm) 7.54 (s) ($C_6H_4$), 0.32 (s) 0.31 (s) (Si—$CH_3$). $^{13}$C NMR (ppm) 140.8, 132.2, ($C_6H_4$), 87.0, 84.9 (—C≡C—C≡C—), 0.92 (Si—$CH_3$).

EXAMPLE 10

Crosslinking of Precursor, Where n=1—(see Example 6 for synthesis of precursor)—To a platinum thermogravimetric analyzer pan was placed 40.4430 mg of the precursor 208. The sample was then isothermally heated under an atmosphere of dry nitrogen at 150, 200, 350 and 450° C. for 60, 60, 120 and 120 minutes, respectively. After completion of the isothermal curing experiment, the sample was void free and exhibited the characteristics of an elastomeric material; i.e., soft and flexible.

EXAMPLE 11

Post Crosslinking Thermo-Oxidative Stability Study on Networked Polymer, Where n=1—(see Example 6 for synthesis of precursor and Example 10 for crosslinking of precursor)—Following the crosslinking of the precursor 208, where n=1 the sample was allowed to cool to ambient temperature. The sample was then isothermally heated (in the chamber of a thermogravimetric analyzer) for 120 minutes at 200, 250, 300, and 350° C., respectively, in an air atmosphere. The sample exhibited good oxidative stability over the time frame of the experiment, experiencing an 18.82% weight loss.

EXAMPLE 12

Crosslinking of Precursor, Where n=2—(see Example 7 for synthesis of precursor)—To a platinum thermogravimetric analyzer pan was placed 23.8740 mg of the precursor 208. The sample was then isothermally heated under an atmosphere of dry nitrogen at 150, 200, 350 and 450° C. for 60, 60, 120 and 120 minutes, respectively. After completion of the isothermal curing experiment the sample was void free and exhibited the characteristics of an elastomeric material; i.e., soft and flexible.

EXAMPLE 13

Post Crosslinking Thermo-Oxidative Stability Study on Networked Polymer, Where n=2—(see Example 7 for synthesis of precursor and Example 12 for crosslinking of precursor)—Following the crosslinking of the precursor 208, where n=2 the sample was allowed to cool to ambient temperature. The sample was then isothermally heated (in the chamber of a thermogravimetric analyzer) for 120 minutes at 200, 250, 300, and 350° C., respectively, in an air atmosphere. The sample exhibited good oxidative stability over the time frame of the experiment, experiencing an 18.44% weight loss.

EXAMPLE 14

Crosslinking of Precursor, Where n=3—(see Example 8 for synthesis of precursor)—To a platinum thermogravimetric analyzer pan was placed 24.6430 mg of the precursor 208, where n=3. The sample was then isothermally heated under an atmosphere of dry nitrogen at 150, 200, 350 and 450° C. for 60, 60, 120 and 120 minutes, respectively. After completion of the isothermal curing experiment the sample was void free and exhibited the characteristics of an elastomeric material; i.e., soft and flexible.

EXAMPLE 15

Post Crosslinking Thermo-Oxidative Stability Study on Networked Polymer, Where n=3—(see Example 8 for synthesis of precursor and Example 14 for crosslinking of precursor)—Following the crosslinking of the precursor 208, where n=3 the sample was allowed to cool to ambient temperature. The sample was then isothermally heated (in the chamber of a thermogravimetric analyzer) for 120 minutes at 200, 250, 300, and 350° C., respectively, in an air atmosphere. The sample exhibited good oxidative stability over the time frame of the experiment, experiencing a 13.55% weight loss.

EXAMPLE 16

Crosslinking of Precursor, Where n=4—(see Example 9 for synthesis of precursor)—To a platinum thermogravimetric analyzer pan was placed 27.8090 mg of the precursor 208. The sample was then isothermally heated under an atmosphere of dry nitrogen at 150, 200, 350 and 450° C. for 60, 60, 120 and 120 minutes, respectively. After completion of the isothermal curing experiment the sample was void free and exhibited the characteristics of an elastomeric material; i.e., soft and flexible.

EXAMPLE 17

Post Crosslinking Thermo-Oxidative Stability Study on Networked Polymer, Where n=4—(see Example 9 for synthesis of precursor and Example 16 for crosslinking of precursor)—Following the crosslinking of the precursor 208, where n=4 the sample was allowed to cool to ambient temperature. The sample was then isothermally heated (in the chamber of a thermogravimetric analyzer) for 120 minutes at 200, 250, 300, and 350° C., respectively, in an air atmosphere. The sample exhibited good oxidative stability over the time frame of the experiment, experiencing a 19.77% weight loss.

EXAMPLE 18

Determination of the Glass Transition Temperature for Networked Polymer, Where n=1—Crosslinked samples were prepared by heating the precursor 208 for 2 hours at 150, 250 and 350° C., respectively, in the chamber of a thermogravimetric analyzer. Following the isothermal curing cycle the sample was allowed to cool to ambient temperature. 12.5 mg of the cured sample was weighed into a differential scanning calorimetry pan and the pan was hermetically sealed. The sample was cooled to −70° C. and then heated at a rate of 5° C./minute to 400° C. A glass transition was observed at −29° C.

EXAMPLE 19

Determination of the Glass Transition Temperature for Networked Polymer, Where n=2—Crosslinked samples were prepared by heating the precursor 208 for 2 hours at 150, 250 and 350° C., respectively, in the chamber of a thermogravimetric analyzer. Following the isothermal curing cycle the sample was allowed to cool to ambient temperature. 11.6 mg of the cured sample was weighed into a differential scanning calorimetry pan and the pan was hermetically sealed. The sample was cooled to −70° C. and then heated at a rate of 5° C./minute to 400° C. A glass transition was observed at −28° C.

EXAMPLE 20

Determination of the Glass Transition Temperature for Networked Polymer, Where n=3—Crosslinked samples were prepared by heating the precursor 208 for 2 hours at 150, 250 and 350° C., respectively, in the chamber of a thermogravimetric analyzer. Following the isothermal curing cycle the sample was allowed to cool to ambient temperature. 8.8 mg of the cured sample was weighed into a differential scanning calorimetry pan and the pan was hermetically sealed. The sample was cooled to −70° C. and then heated at a rate of 5° C./minute to 100° C. A glass transition was observed at −22° C.

EXAMPLE 21

Determination of the Glass Transition Temperature for Networked Polymer, Where n=4—Crosslinked samples were prepared by heating the precursor 208 for 2 hours at 150, 250 and 350° C., respectively, in the chamber of a thermogravimetric analyzer. Following the isothermal curing cycle the sample was allowed to cool to ambient temperature. 13.0 mg of the cured sample was weighed into a differential scanning calorimetry pan and the pan was hermetically sealed. The sample was cooled to −70° C. and then heated at a rate of 5° C./minute to 100° C. A glass transition was observed at −29° C.

EXAMPLE 22

Post Cure Dynamic Thermogravimetric Analysis for Networked Polymer, Where n=1—A crosslinked sample was prepared by heating the precursor 208 for 2 hours at 150, 250 and 350° C., respectively, in the chamber of a thermogravimetric analyzer. The sample was allowed to cool to ambient temperature and then heated to 1000° C. at a rate of 10° C./minute under an atmosphere of dry nitrogen. A one step thermal degradation commenced to occur above 400° C., weight loss was over by 600° C. resulting in a char yield of 66.0%.

EXAMPLE 23

Post Cure Dynamic Thermogravimetric Analysis for Networked Polymer, Where n=2—A crosslinked sample was prepared by heating the precursor 208 for 2 hours at 150, 250 and 350° C., respectively, in the chamber of a thermogravimetric analyzer. The sample was allowed to cool to ambient temperature and then heated to 1000° C. at a rate of 10° C./minute under an atmosphere of dry nitrogen. A one step thermal degradation commenced to occur above 400° C., weight loss was over by 600° C. resulting in a char yield of 44.0%.

EXAMPLE 24

Post Cure Dynamic Thermogravimetric Analysis for Networked Polymer, Where n=3—A crosslinked sample was prepared by heating the precursor 208 for 2 hours at 150, 250 and 350° C., respectively, in the chamber of a thermogravimetric analyzer. The sample was allowed to cool to ambient temperature and then heated to 1000° C. at a rate of 10° C./minute under an atmosphere of dry nitrogen. A one step thermal degradation commenced to occur above 400° C., weight loss was over by 600° C. resulting in a char yield of 35.0%.

EXAMPLE 25

Post Cure Dynamic Thermogravimetric Analysis for Networked Polymer, Where n=4—A crosslinked sample was prepared by heating the precursor 208 for 2 hours at 150, 250 and 350° C., respectively, in the chamber of a thermogravimetric analyzer. The sample was allowed to cool to ambient temperature and then heated to 1000° C. at a rate of 10° C./minute under an atmosphere of dry nitrogen. A one step thermal degradation commenced to occur above 400° C., weight loss was over by 600° C. resulting in a char yield of 40.0%.

What is claimed is:

1. A precursor comprising the formula:

wherein n>0;

wherein n is an average value obtained by averaging all repeating units of the precursor;

wherein m≧1;

wherein X is a divalent group containing one or more acetylenic groups;

wherein $Ar_1$ and $Ar_2$ are independently selected aromatic groups; and wherein each R is independently selected from the group consisting of alkyl, aryl, alkylaryl, haloalkyl, haloaryl, and combinations thereof.

2. The precursor of claim 1, wherein X is 1,4-butadiynylene.

3. The precursor of claim 1, wherein one or more of the $Ar_1$ and $Ar_2$ groups is phenylene.

4. The precursor of claim 1, wherein one or more of the R groups is —$CH_3$.

5. The precursor of claim 1, wherein the precursor comprises the formula:

6. The precursor of claim 5, wherein n is selected from the group consisting of 1, 2, 3, and 4.

7. A networked polymer comprising the formula:

wherein n>0;

wherein n is an average value obtained by averaging all repeating units of the networked polymer;

wherein m≧1;

wherein Y is a divalent group containing one or more acetylenic groups, one or more crosslinks, or both;

wherein z is the average number of crosslinks per Y group;

wherein $Ar_1$ and $Ar_2$ are independently selected aromatic groups; and wherein each R is independently selected from the group consisting of alkyl, aryl, alkylaryl, haloalkyl, haloaryl, and combinations thereof.

8. The networked polymer of claim 7, wherein the networked polymer is formed by crosslinking a precursor comprising the formula:

wherein X is a divalent group containing one or more acetylenic groups.

9. The networked polymer of claim 8, wherein X is 1,4-butadiynylene.

10. The networked polymer of claim 7, wherein one or more of the Ar$_1$ and Ar$_2$ groups is phenylene.

11. The networked polymer of claim 7, wherein one or more of the R groups is —CH$_3$.

12. The networked polymer of claim 7, wherein the networked polymer comprises the formula:

13. The networked polymer of claim 12, wherein the networked polymer is formed by crosslinking a precursor comprising the formula:

14. The networked polymer of claim 12, wherein n is selected from the group consisting of 1, 2, 3, and 4.

15. A process of preparing a precursor comprising the formula;

wherein n>0;
wherein n is an average value obtained by averaging all repeating units of the precursor;
wherein m≧1;
wherein X is a divalent group containing one or more acetylenic groups;
wherein Ar$_1$ and Ar$_2$ are independently selected aromatic groups; and
wherein each R is independently selected from the group consisting of alkyl, aryl, alkylaryl, haloalkyl, haloaryl, and combinations thereof;

comprising the step of:

reacting a prepolymer comprising the formula:

with a bis(dimethylaminosilyl)alkyne comprising the formula:

wherein X is a divalent group containing one or more acetylenic groups.

16. The process of claim 15, wherein one or more of the Ar$_1$ and Ar$_2$ groups is phenylene.

17. The process of claim 15, wherein one or more of the R groups is —CH$_3$.

18. The process of claim 15, wherein the prepolymer comprises the formula:

wherein the bis(dimethylaminosilyl)alkyne is 1,4-bis(dimethylaminodimethylsilyl)butadiyne; and wherein the precursor comprises the formula:

19. A process of preparing a networked polymer comprising the formula:

wherein n>0;

wherein n is an average value obtained by averaging all repeating units of the networked polymer;

wherein m>1;

wherein Y is a divalent group containing one or more acetylenic groups, one or more crosslinks, or both;

wherein z is the average number of crosslinks per Y group;

wherein $Ar_1$ and $Ar_2$ are independently selected aromatic groups; and wherein each R is independently selected from the group consisting of alkyl, aryl, alkylaryl, haloalkyl, haloaryl, and combinations thereof;

comprising the step of:

crosslinking a precursor comprising the formula:

$$\left[ \begin{array}{c} R \\ | \\ Si-X-Si-O-Si-Ar_1-Si- \\ | \\ R \end{array} \begin{array}{c} R \\ | \\ \\ | \\ R \end{array} \begin{array}{c} R \\ | \\ \\ | \\ R \end{array} \begin{array}{c} R \\ | \\ \\ | \\ R \end{array} \left( O-\begin{array}{c} R \\ | \\ Si \\ | \\ R \end{array} -Ar_2-\begin{array}{c} R \\ | \\ Si \\ | \\ R \end{array} -O-\begin{array}{c} R \\ | \\ Si \\ | \\ R \end{array} -Ar_1-\begin{array}{c} R \\ | \\ Si \\ | \\ R \end{array} \right)_n -O \right]_m;$$

wherein X is a divalent group containing one or more acetylenic groups.

20. The process of claim 19, wherein one or more of the $Ar_1$ and $Ar_2$ groups is phenylene.

21. The process of claim 19, wherein one or more of R groups is —$CH_3$.

22. The process of claim 19, wherein the crosslinking is performed by heating the precursor.

23. The process of claim 22, wherein the heating conditions are at least sufficient to initiate crosslinking and wherein the heating conditions do not cause degradation of the precursor or the networked polymer.

24. The process of claim 22, wherein the heating is performed at one or more temperatures film about 100° C. to about 500° C.

25. The process of claim 19, wherein the precursor comprises the formula:

and wherein the networked polymer comprises the formula:

* * * * *